Sept. 4, 1928.
E. TYDEN
1,683,002
VALVE CONSTRUCTION
Filed Feb. 3, 1926
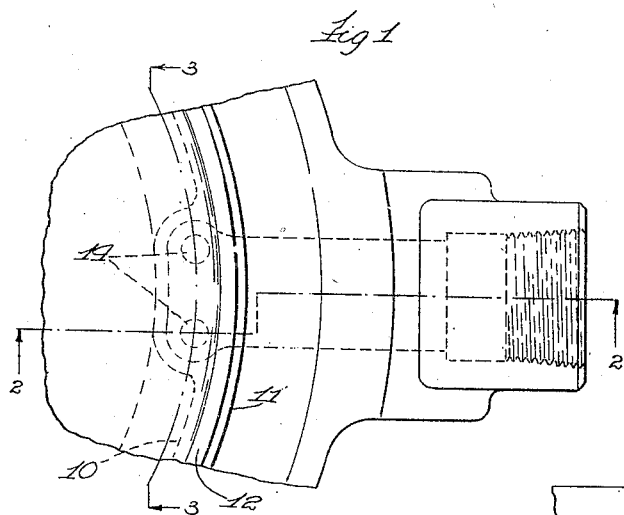
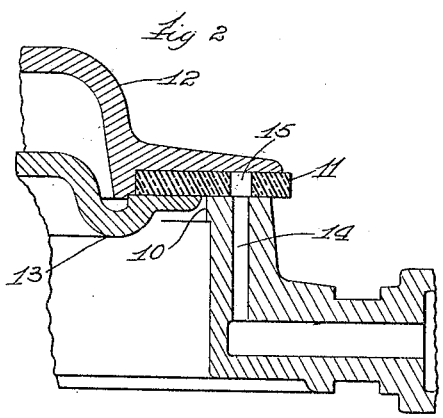
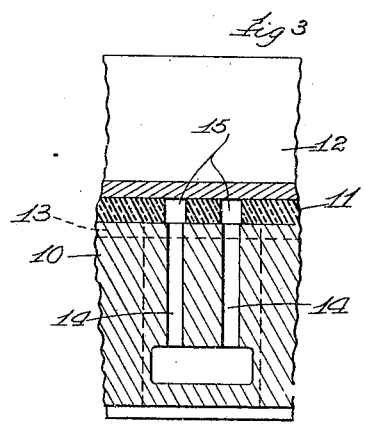
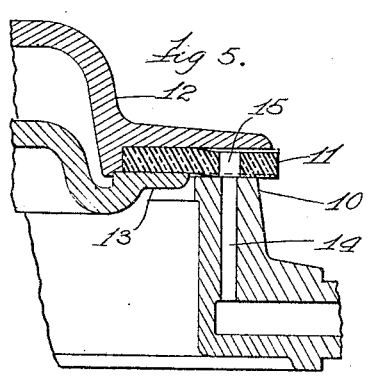
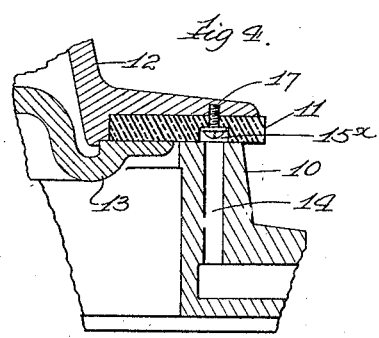
Witness
N. C. McKnight.
Inventor.
Emil Tyden.
by Burton & Burton
his Attorneys.

Patented Sept. 4, 1928.

1,683,002

UNITED STATES PATENT OFFICE.

EMIL TYDEN, OF EVANSTON, ILLINOIS.

VALVE CONSTRUCTION.

Application filed February 3, 1926. Serial No. 85,656.

The purpose of this invention is to provide a form and construction of valve and seat adapted for a particular situation such as arises in the construction of dry pipe valve devices in which an auxiliary port is controlled by the same valve member which controls the main water inlet port, said auxiliary port being formed through the seat of the main valve, and said main valve having its seating face, as in customary, formed by a somewhat flexible annular lip which is held to the main valve body by clamping the inner margin of the annulus, leaving an outer annular area free to yield flexibly as well as compressibly in the seating action. In such construction the flexibility of the seating lip or annulus of the main valve, which also operates as the valve for the small auxiliary port situated at one side of the large annular seat of the main valve, tends to delay the opening of the auxiliary port. This auxiliary port is the entrance to a duct through which the water is to pass for operating an alarm device which it is important should be operated and sounded very promptly upon the initial opening of the main valve, because its purpose is to signal the fact that said main valve is opening. The specific purpose of the present invention is to prevent the delay in the opening of the auxiliary port under the circumstances without interfering with the function of the flexibility and compressibility of the seating lip of the valve. The invention consists in the elements and features of construction shown and described as indicated in the claims.

In the drawings:—

Figure 1 is a plan view of a portion of the main water-controlling valve of a dry pipe valve construction having an auxiliary port through the valve seat controlled by the main valve lip.

Figure 2 is a detail section at the line 2—2 on Figure 1.

Figure 3 is a section at the line 3—3 on Figure 1.

Figure 4 is a detail view similar to Figure 2 showing a slight modification.

Figure 5 is a view similar to Figure 2 showing the valve elements in a different position such as might result from the sticking of the valve lip to the seat in the opening movement.

In the construction shown in the drawings, 10 is the annular seat encompassing the water inlet port of a dry pipe valve casing. 11 is the seating lip of relatively soft compressible and flexible material, as rubber or leather. 13 is the clamp member for binding the seating lip, 11, to the main body, 12. 14 is an auxiliary port leading from the main valve seat for discharge of water outside the main valve body. In the construction shown, in accordance with actual practice, there are two such ports, both leading to the same discharge as seen in Figures 1 and 3, these ports being located only a short distance apart, the ports being thus duplicated for avoiding an unduly large single port. The present invention is carried out by forming in the valve lip, 11, apertures, 15, for registering with the ports, 14, preferably slightly greater in diameter than said ports. The reason for this construction and in what manner it serves the purpose which constitutes the motive for the invention, may be understood upon considering that when the lip, 11, of relatively soft compressible material, and without regard to its flexibility, is without an aperture, and, on the contrary, seats bodily and completely over and in such manner as to close directly the auxiliary port, 14, the pressure by which the main valve is seated operates with a tendency to sink the rubber or leather of the lip somewhat into the port, and that after any considerable length of service there will be formed a nipple projecting from the under side of the leather or rubber lip fitting piston-wise in the mouth of the auxiliary port, and that, therefore, when the main valve begins to open, it will open at least as far as the length of this nipple, before the auxiliary port will be opened at all. This delay in opening is a very serious matter in view of the importance of getting the water into the auxiliary port for giving the alarm instantly upon the initial opening of the main valve. By forming in the lip a recess at the proper position for registering with the auxiliary port, even though that recess be not a complete aperture, if it is of slightly greater diameter than the port, the formation of the piston-like nipple protruding into the port is prevented, and the delay of opening which this nipple causes is thereby avoided. From the foregoing statement it will be recognized that for the purpose of this particular use a recess only, and not a complete aperture, is necessary provided the recess be of enough greater diameter to insure against the contraction thereof by the yielding of the yielding material of the valve lift so as to first overhang the margin of the port and then be crowded down into the latter, forming the objectionable piston-like nipple, delaying the opening of the port as described, and in Figure 4 there is shown a construction in which there is shown only a recess in the seating lip, 11, not constituting a complete aperture through it. This construction may be employed when for any reason the flexibilty of the lip is not depended upon for any function of the main valve and in which, therefore, it might be entirely suitable to secure the lip positively to the main valve, not only at the inner margin where it is clamped, but also at the outer seating area, as by a screw, 17, which might be inserted at the recess mentioned, denoted 15ˣ, in Figure 4.

A complete aperture, however, is preferable, especially in view of the function of the flexibility of the lip as the seating face of the main valve; and for the reason that beside avoiding the formation of the nipple protruding into the port as described, when the aperture extends entirely through the seating lip if there is a tendency of the lip to adhere to the valve seat, as is not unlikely to occur, so that upon the initial opening movement of the main valve the lip, sticking to the seat, will be flexed away from the main valve body, 10, as indicated in Figure 5, such adhesion of the lip to the valve seat will not prevent the instantaneous opening of the auxiliary port, because when the lip adheres to the valve seat in the opening movement of the main valve, it is pulled away from the valve body, and an aperture is thereby created at the upper side of the lip through which the water will gain access to the auxiliary port through the aperture, 15, as effectively as if the lip has been lifted from the seat instead of adhering thereto.

I do not limit myself therefore to an aperture opening entirely through the seating face member of the valve, but consider my invention includes also such a construction as that shown in Figure 4 in which there is a recess of considerably greater diameter than the port not opening entirely through the valve element.

For clear understanding of the reason for the specific construction illustrated in Figure 5, it should be borne in mind that the occasion for the alarm valve and the duct by which the water under pressure may reach and operate it, is the liability to what is known as "columning",—that is, the gradual accumulation of water above the main valve by the momentary slight opening and instant closing of the main valve which is caused by the vibration "surge" or "water hammer" to which the water column in the main supply pipe is liable from sudden and short changes in pressure, such as may be due to opening and quick closing of some other pipe leading from the same main; and that under the throbbing of the water in the supply main, the main valve may open momentarily and close again many times, each time admitting a small amount of water to the main valve chamber, before the water accumulated in such manner in the chamber passes the level of the seat so as to have access to the alarm duct; and that water having been thus admitted by the last of such repeated throbbings, just sufficiently to cover the seat and enter the alarm duct, the main valve may close cutting off the pressure from the alarm duct before the alarm is operated. And it may happen that at the next throb the opening movement of the main valve may not lift the lip from the seat but may leave it as seen in Fig. 5, separated at its outer circumference from the valve body, and thereby admitting the water previously accumulated under pressure from the air pressure region of the system and causing the alarm to operate.

Also it may be borne in mind that it is a common practice in this type of dry pipe systems in setting the main valve for service, to admit above the seated valve enough water to seal the seat; and in such case it will be seen that the water will obtain access to the alarm duct when the main valve is open, as seen in Figure 5, though such opening admits no such water from the main.

I claim:—

1. In a valve device for controlling a port encompassed by a seat for the valve, a valve comprising a face-forming part of relatively soft compressible material as rubber, leather and the like, and a rigid part forming the backing for the valve on which said compressible part is mounted, said compressible part having a recess open toward the valve seat and extending entirely through said compressible part so as to constitute an aperture therethrough, said aperture being at least equal in area to the port to be controlled and positioned for registering with said port at the seating position of the valve, wherey said apertured part operates valve-wise at its opposite faces upon the valve seat and upon the backing member of the valve respectively.

2. In a construction for the purpose indicated, in combination with a main water inlet and a member for carrying a main valve to control said inlet, a relatively small auxiliary duct leading to the outside for operating a signal by water escaping through said duct, a valve element for controlling said auxiliary duct carried by the main valve-carrying member having a face-forming part of relatively soft compressible material as rubber, leather, and the like; a rigid part extended from said valve-carrying member forming the backing for said compressible part, the latter having a recess opening toward the auxiliary valve seat of substantially greater width than said auxiliary port and positioned for registering with said port at the seating position of said auxiliary valve.

3. In a construction for the purpose indicated in combination with the main water inlet and main valve controlling the same and its seat encompassing said inlet, a relatively small auxiliary duct having its port opening through said main valve seat, the seating face member of the main valve being formed by relatively soft compressible material as rubber, leather and the like, said main valve face member extending over and constituting the valve for the auxiliary duct port, and having an aperture registering with said port at the seating position of the valve, said aperture being of substantially greater diameter than said auxiliary duct port.

4. In a construction for the purpose indicated and the like, a valve seat encompassing a fluid inlet port and a duct for an auxiliary purpose having its port opening through said seat; a main valve for the fluid inlet port having a seating face member of relatively soft material, as rubber, leather and the like, said member extending over and constituting the valve for the auxiliary duct port and having an aperture registering with said port at seated position of the valve, the seating face member being secured to the main valve body at its inner margin and unattached at its outer annular area, whereby at said area it is free to be separated by flexure from the body of the valve member, the aperture which registers with the auxiliary duct port being wholly within said unattached and separable area.

In testimony whereof I have hereunto set my hand at Los Angeles, California, this 28th day of January, 1926.

EMIL TYDEN.